US006816987B1

(12) United States Patent
Olson et al.

(10) Patent No.: US 6,816,987 B1
(45) Date of Patent: Nov. 9, 2004

(54) APPARATUS AND METHOD FOR BUILT-IN SELF-TEST OF A DATA COMMUNICATIONS SYSTEM

(75) Inventors: Erlend Olson, Duarte, CA (US); Rick Berard, Pasadena, CA (US); David Vetea Greig, Pasadena, CA (US); Christopher Pasqualino, Glendora, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/536,008

(22) Filed: Mar. 25, 2000

(51) Int. Cl.[7] .............................................. G06F 11/00
(52) U.S. Cl. ..................... 714/704; 714/715; 714/712
(58) Field of Search ................................ 714/712, 715, 714/704, 733

(56) References Cited

U.S. PATENT DOCUMENTS

| | | | |
|---|---|---|---|
| 4,228,369 A | | 10/1980 | Anantha et al. |
| 5,396,028 A | | 3/1995 | Tomassetti |
| 5,422,608 A | | 6/1995 | Levesque |
| 5,559,448 A | | 9/1996 | Koenig |
| 5,585,741 A | | 12/1996 | Jordan |
| 5,614,873 A | | 3/1997 | Hageraats |
| 5,680,060 A | | 10/1997 | Banniza et al. |
| 5,726,582 A | | 3/1998 | Hedberg |
| 5,751,152 A | * | 5/1998 | DuBose et al. ............. 324/628 |
| 5,939,896 A | | 8/1999 | Hedberg |
| 6,438,717 B1 | * | 8/2002 | Butler et al. ................ 714/704 |

FOREIGN PATENT DOCUMENTS

WO    WO 99/37067    7/1999

OTHER PUBLICATIONS

Pivotal Technologies, Inc. (2000), "DVI Reciever DVI 1.0 Dual Link Compliant PVT53D10R0", Technical information, Rev. 2.3, pp. 1–8.

Pivotal Technologies, Inc. (2000), "DVI Transmitter DVI–1.0 Compliant PVT53D10T0", Technical information, Rev. 2.2, pp. 1–8.

Gaganon, M., Kaminska, B., "Optical Communication Channel Testing Using BIST Apprches," Nov. 1–6, 1997, pp. 626–635, Test Conference, 1997 Proceedings, International.

Dufaza, C., Ihs, Hassan, Test Synthesis for DC Test and Maximal Diagnosis of Switched–Capacitor Circuits, 1997, pp. 252–260, IEEE, France.

Roberts, G., Dufort, B., "Making Complex Mixed–Signal Telecommunication Integrated Circuits Testable," Jun. 1999, pp. 90–96, IEEE Communications Magazine, USA.

Heutmaker, M., Le, D., "An Architecture for Self–Test of a Wireless Communication System Using Sampled IQ Modulation and Boundary Scan," Jun. 1999, pp. 98–102, IEEE Communications Magazine, USA.

Mukherjee, N., Chakraborty, T., "Built–In Self–Test: A Complete Test Solution for Telecommunications Systems," Jun. 1999, pp. 72–78, IEEE Communications Magazine, USA.

Adham, S., Brough, K., Ecroyd, B, "Linking Diagnostic Software to Hardware Self–Test In Telecom Systems," Jun. 1999, pp. 79–83, IEEE Communications Magazine, USA.

* cited by examiner

*Primary Examiner*—Phung M. Chung
(74) *Attorney, Agent, or Firm*—Christie, Parker & Hale, LLP

(57) ABSTRACT

The present invention comprises an apparatus and corresponding method for performing a built-in self-test (BIST) of a data communications system. The apparatus of the invention includes a transmitter, a receiver coupled to the transmitter and a test control system coupled to the transmitter and receiver for measuring a data error rate of the data communications system. The transmitter, receiver and test control system are disposed on a common substrate, such as an integrated circuit.

8 Claims, 14 Drawing Sheets

CHARACTERIZATION TABLE

|     | $T_1$ | $T_2$ | $T_3$ | $T_4$ | $T_5$ | $T_6$ |
|-----|-------|-------|-------|-------|-------|-------|
| $V_1$ | $B_7$ | $B_6$ | $B_6$ | $B_5$ | $B_7$ | $B_7$ |
| $V_2$ | $B_6$ | $B_4$ | $(B_1)$ | $(B_3)$ | $B_4$ | $B_6$ |
| $V_3$ | $B_5$ | $(B_2)$ | $(B_1)$ | $(B_2)$ | $B_5$ | $B_6$ |
| $V_4$ | $B_5$ | $B_4$ | $(B_2)$ | $(B_1)$ | $(B_3)$ | $B_5$ |
| $V_5$ | $B_6$ | $(B_3)$ | $B_4$ | $B_4$ | $B_4$ | $B_5$ |
| $V_6$ | $B_6$ | $B_5$ | $B_4$ | $B_6$ | $B_6$ | $B_7$ |

APPARATUS AND METHOD FOR BUILT-IN SELF-TEST OF A DATA COMMUNICATIONS SYSTEM

BACKGROUND OF THE INVENTION

1. Field of the Invention

This invention relates generally to the testing of data communications systems and in particular to an apparatus and method for testing data communications systems using built-in self test.

2. Description of the Related Art

Data communications systems are constantly improving in functionality and speed. These systems are also becoming smaller and denser as a result of advances in integrated circuit technology. As integrated circuits are fabricated using increasingly smaller submicron process technologies, multiple subsystems can be combined on a single integrated circuit to produce what is referred to as a System-On-a-Chip or SOC.

As more complex systems, particularly mixed-signal systems, are implemented as SOCs, however, it has become increasingly difficult to test and verify their operation due to several factors. First, the signals generated and used by the various subsystems within a SOC are not readily accessible from outside the integrated circuit, due to the large number of additional pins that would otherwise have to be added to the chip package. Second, the operating frequencies of SOCs, particularly those used in the latest data communications applications, have now reached extremely high speeds, commonly in the GHz range. Third, mixed-signal SOCs, which contain both digital and analog circuitry, require the testing of both the digital and analog characteristics of the signals that they output.

A variety of approaches have been devised to test SOCs. A conventional testing approach is to apply test vectors to, and measure the response from, the SOC through its pins using automated test equipment or ATE. This approach is becoming increasingly impractical because ATEs are having difficulty in keeping up with the continuously increasing speeds of SOCs. In addition, it is difficult for ATEs to adequately test the increasingly complex circuitry of SOCs because the ATE is limited to accessing the internal circuits of an SOC only through its pins. Furthermore, ATEs typically are not capable of testing mixed-signal SOCs because they generally are intended for testing either digital or analog integrated circuits, but not both.

Another testing approach, known as built-in self-test or BIST, includes test circuitry for testing the SOC on the same integrated circuit substrate as the SOC. Consequently, BIST provides an effective way to test the functional operation of SOCs at their full operating speed. However, conventional BIST schemes are primarily intended to test the functionality of digital circuitry and thus do not provide a satisfactory way to verify the exacting timing and voltage specifications (i.e., parametric testing) of the high-speed SOCs used in data communications applications.

In view of the shortcomings of the above-described testing approaches, it is an object of the invention to provide an apparatus and method for testing high-speed data communications systems at their full operating speed.

SUMMARY OF THE INVENTION

The present invention comprises an apparatus and corresponding method for performing a built-in self-test (BIST) of a data communications system. The apparatus of the invention includes a transmitter, a receiver coupled to the transmitter and a test control system coupled to the transmitter and receiver for measuring a data error rate of the data communications system. The transmitter, receiver and test control system are disposed on a common substrate, such as an integrated circuit.

An advantage of the invention is that it enables functional and/or parametric tests to be performed on the transmitter and/or receiver of the data communications system at the full operating speed of the system. Another advantage of the invention is that it allows the data communications circuit to be thoroughly tested in a relatively short amount of time.

These and other features and advantages of the invention will be better appreciated from the following detailed description of the invention together with the appended drawings.

BRIEF DESCRIPTION OF THE DRAWINGS

FIG. 1 is a block diagram of a data communications system with built-in self-test in accordance with a preferred embodiment of the invention.

FIG. 5 is a table containing characterization data for the data communications system of FIG. 1.

DETAILED DESCRIPTION OF THE PREFERRED EMBODIMENTS

Figure 2:
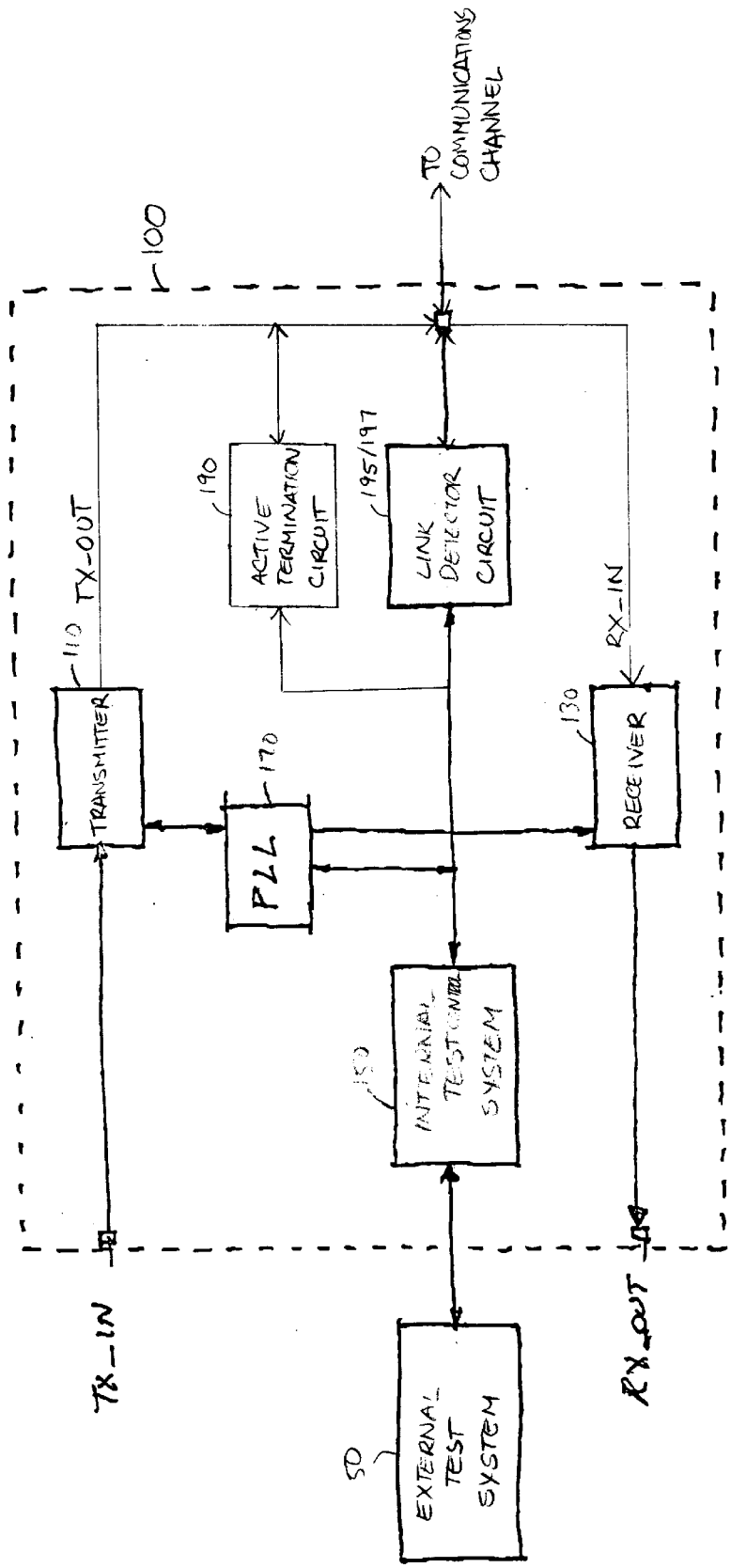
FIG. 2 is an eye diagram mask for the transmitter of FIG. 1.
Figure 2:
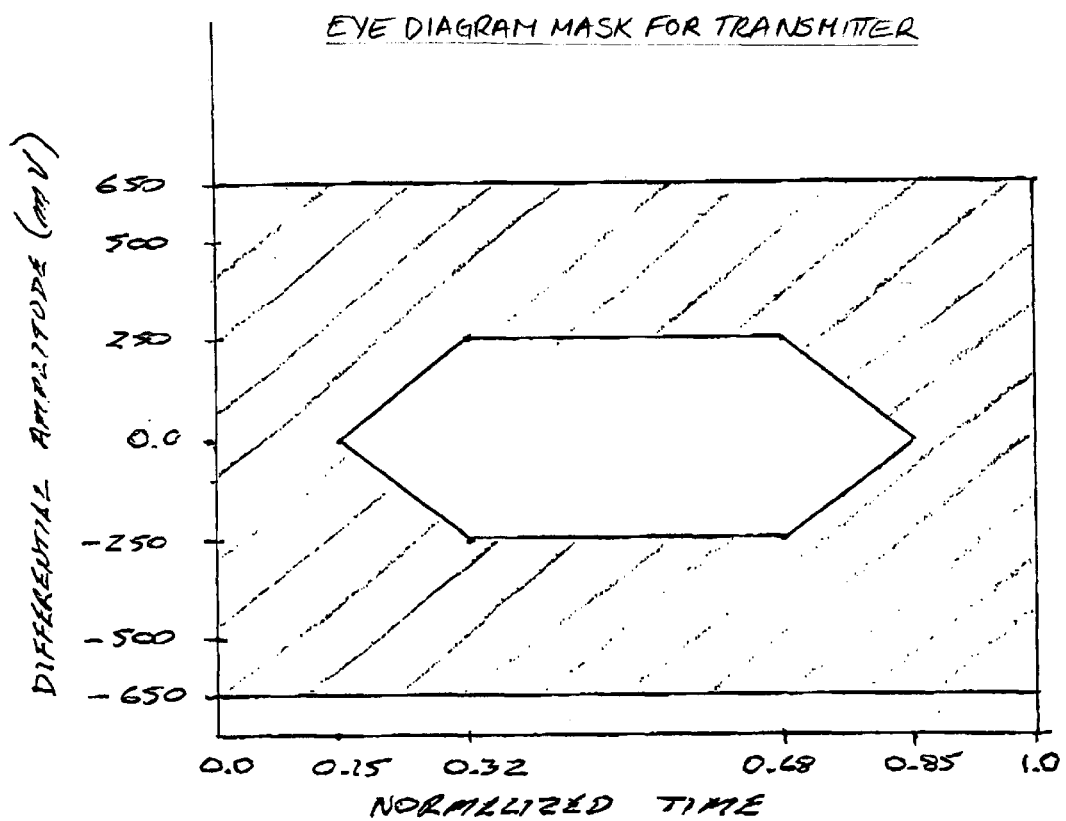

The present invention comprises a high-speed, data communications system with built-in self-test that is capable of performing both functional (i.e., logic) and parametric (i.e., signal amplitude and timing) tests on itself without the use of external test equipment. Consequently, the circuit can be tested at significantly less cost than conventional testing methods and at clock speeds beyond the present capabilities of commercially-available automated test equipment. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Moreover, in the following description, numerous details are set forth for purpose of explanation. However, one of ordinary skill in the art would realize that the invention maybe practiced without the use of these specific details. In other instances, well-known structures and devices are shown in block diagram form in order not to obscure the description of the invention with unnecessary detail. Thus, the present invention is not intended to be limited to the embodiment shown, but is to be accorded the widest scope consistent with the principles and features disclosed herein.

FIG. 1 is a block diagram of a data communications system 100 with built-in self-test in accordance with a preferred embodiment of the invention. The data communications system 100 is tested while connected to an external test system 50, as described further below.

The data communications system 100 may be configured at manufacture or installation as either a transmitter or a receiver. As a transmitter, the data communications system 100 receives a TX_IN signal and outputs a TX_OUT signal for transmission across a communications channel to an external receiver (not shown). As a receiver, the data communications system 100 receives an RX_IN signal transmitted across a communications channel from an external transmitter (not shown) and outputs a RX_OUT signal. In a preferred embodiment, the data communications system 100 is implemented on an integrated circuit, either alone or with other interconnected circuitry.

The data communications system 100 includes a transmitter 110, a receiver 130, an internal test control system 150 and a phase-locked loop (PLL) 170. In a preferred embodiment of the invention, the data communications system 100 is disposed on an integrated circuit where all of the elements of the circuit are contained on a common substrate. Although the data communications system 100 contains both transmitter and receiver, only one of the circuits is turned on and functional during normal operation. During manufacture, the data communications system 100 is placed in a self-test mode in which the transmitter 110 tests the receiver 130 and conversely, the receiver 130 tests the transmitter 110. The internal test control system 150 is used to control the transmitter 110 and receiver 130 so as to perform the self-test procedure. The PLL 170 generates a clock signal for use by both the transmitter 110 and receiver 130.

In a preferred embodiment of the invention, the data communications system 100 also includes an adjustable active termination circuit 190 and a link detector circuit 195. The active termination circuit 190 provides termination for the conductor(s) of the communications channel. The link detector circuit 195 is used by the receiver 130 to detect the presence of a transmitter 110 connected across the communications channel.

In a preferred embodiment of the invention, the data communications system 100 comprises a Digital Visual Interface (DVI) transmitter or receiver. The DVI transmitter or receiver is used to transmit or receive a digital video signal over one or more high-speed (e.g., clock frequency of 250 MHz to 2.5; GHz) T.M.D.S. (i.e., transition-minimized differential signaling) serial data communications channels. In this embodiment, the TX_IN signal received by the transmitter 110 comprises 8-bit wide pixel data, which may be generated, for example, by a graphics controller. The TX_OUT signal output by the transmitter 110 in this embodiment comprises a high-speed differential signal comprising the signal components TX_OUT+ and TX_OUT− for transmission over the T.M.D.S. channel. The RX_IN signal received by the receiver 130 comprises the same type of signal comprising the signal components RX_IN+ and RX_IN−. The RX_OUT signal output by receiver 130 in this embodiment comprises 8-bit wide pixel data, which may be transmitted, for example, to a digital display controller. The present invention, of course, is not limited to this embodiment. In other embodiments, the TX_OUT and RX_IN signals may consist of data in a parallel, rather than serial, format or a non-differential signal.

As will be described in detail below, the data communications system 100 performs a self-test that performs both functional and parametric tests on the transmitter 110 and the receiver 130 during manufacture. The functional tests are performed to determine whether the functionality of the transmitter 110 and the receiver 130 is correct. The parametric tests, in contrast, are performed to determine whether the electrical characteristics (i.e., signal amplitude and timing or jitter) of the output of the transmitter 110 and the input of the receiver 130 meet the required specifications.

FIG. 2 is an eye diagram mask for the output of the transmitter 110 in a preferred embodiment of the invention. The eye diagram mask shows some of the amplitude and timing requirements for the differential TX_OUT signal output by the transmitter 110 under test, as specified by the DVI specification, Rev. 1.0. The vertical axis is the differential amplitude of the TX_OUT signal in millivolts (mV). The horizontal axis is normalized to the bit time (Tbit) of the TX_OUT signal at the testing frequency. The shaded area of the eye diagram mask shows the maximum allowable overshoot and undershoot for the TX_OUT signal to be output by the transmitter 110. The average differential amplitude of the TX_OUT signal corresponding to a logic one is 500 mV. The average differential amplitude of the TX_OUT signal corresponding to logic zero is −500 mV. The maximum allowable overshoot is 15% of the average differential amplitude swing of the TX_OUT signal. The maximum allowable undershoot is 25% of the average differential amplitude swing of the TX_OUT signal. Thus, the average differential amplitude for the TX_OUT signal corresponding to a logic one, including the overshoot and undershoot, is allowed to vary between 250 mV and 650 mV. Similarly, the differential amplitude for the TX_OUT signal corresponding to a logic zero, including the overshoot and undershoot, is allowed to vary between −250 mV and −650 mV. The parametric tests performed during the self-test procedure will verify that the TX_OUT signal output by the transmitter 110 conforms to these amplitude and timing requirements. It should be noted that the voltage levels referred to in the figure are specific to this embodiment of the invention and may be different in other embodiments.

Figure 3:
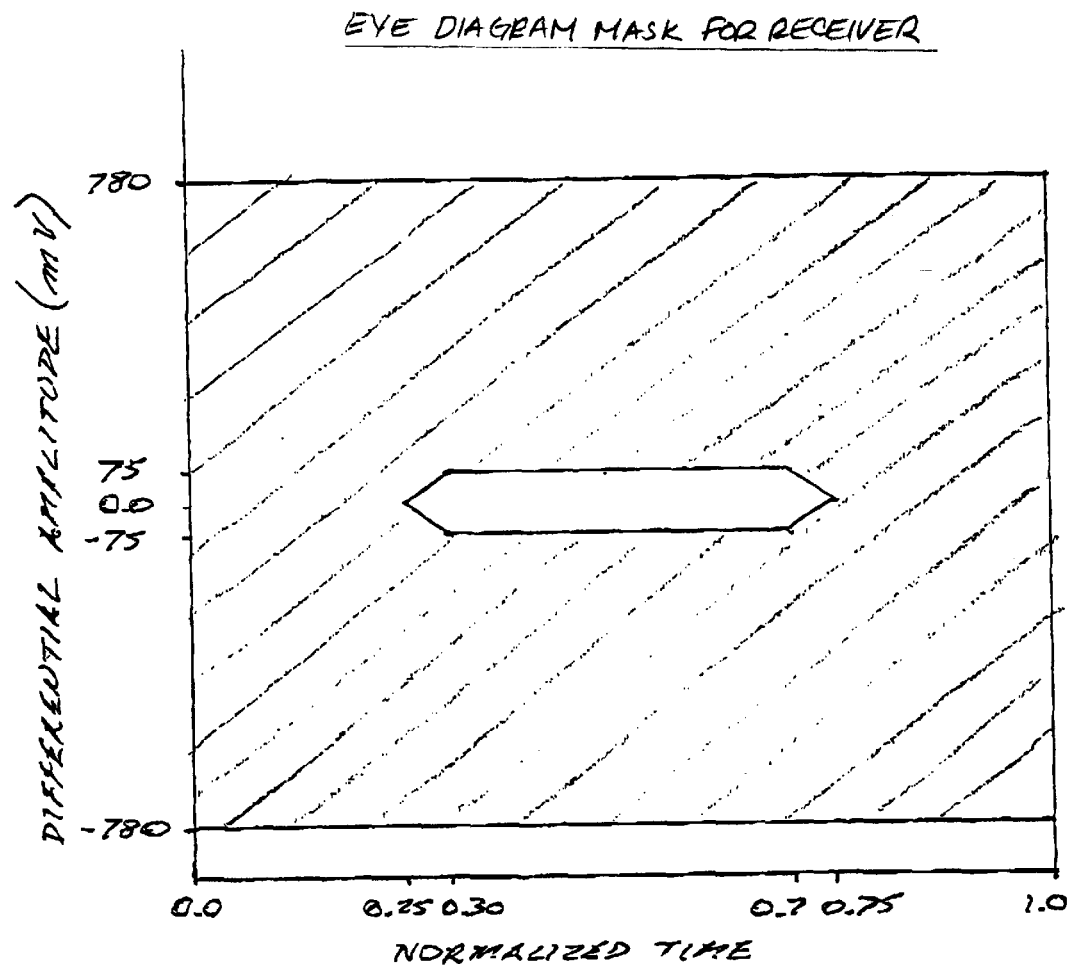
FIG. 3 is an eye diagram mask for the receiver of FIG. 1.

FIG. 3 is an eye diagram mask for the input of the receiver 130 in a preferred embodiment of the invention. The eye diagram mask shows some of the amplitude and timing parameters for the differential RX_IN signal to be received by the receiver 130 under test, as specified by the DVI specification. The vertical axis is the differential amplitude of the RX_IN signal in mV. The horizontal axis is normalized to the bit time (Tbit) of the RX_IN signal at the testing frequency. The shaded area of the eye diagram mask shows the maximum and minimum allowable differential voltages for the RX_IN signal to be received by the receiver 130. The differential amplitude for the RX_IN signal corresponding to a logic one is allowed to vary between 75 mV and 780 mV. Similarly, differential amplitude for the RX_IN signal corresponding to a logic zero is allowed to vary between −75 mV and −780 mV. When presented with the RX_IN signal having these parameters, the receiver 130 shall reproduce a test data stream with a maximum bit error rate of $10^{-8}$ errors per bit. The parametric tests performed during the self-test procedure will verify that the receiver 130 reproduces the received RX_IN signal having these amplitude and timing parameters with a bit error rate less than or equal to the specified maximum error rate.

Figure 4:
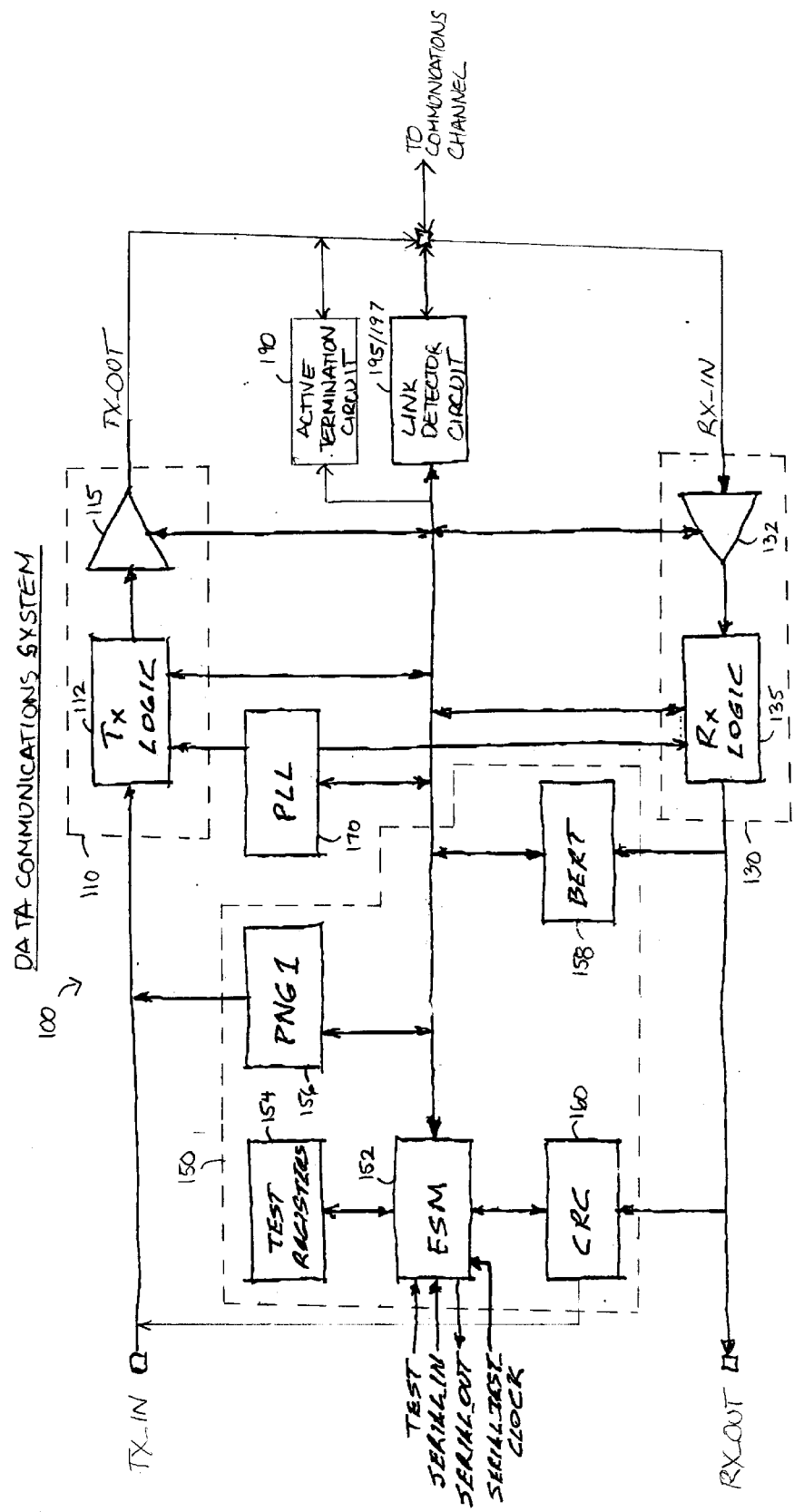
FIG. 4 is a more detailed block diagram of the data communications system of FIG. 1.

FIG. 4 shows the data communications system 100 of a preferred embodiment of the invention in greater detail. The data communications system 100 is shown in the figure with only one channel, although it may actually include multiple channels. The transmitter 110 includes a transmitter logic circuit 112 and an adjustable transmitter output buffer 115. The transmitter logic circuit 112 is used to encode the 8-bit TX_IN signal using the T.M.D.S. algorithm into the serial TX_OUT signal. The adjustable transmitter output buffer 115 is used to drive the TX_OUT signal onto the communications channel. During the self-test procedure, the transmitter output buffer 115 varies the amplitude and skew of the TX_OUT signal under the control of the internal test control system 150.

The receiver 130 includes an adjustable receiver input buffer 132 and a receiver logic circuit 135. The adjustable receiver input buffer 132 is used to receive the RX_IN signal from the communications channel. The receiver input buffer 132 is connected to the transmitter output buffer 115 so that the self-test procedure may be performed. The receiver logic circuit 135 is used to decode the serial RX_IN signal using the T.M.D.S. algorithm into the 8-bit RX_OUT signal.

As previously mentioned, the internal test control system 150 is used to control the transmitter 110 and receiver 130 so as to perform the self-test procedure. The internal test control system 150 includes a finite state machine (FSM) 152, one or more test registers 154, a pseudo-random number generator (PNG) 156, a bit-error rate test (BERT) circuit 158 and a cyclic redundancy check (CRC) circuit 160. The FSM 152 is used to control the sequence of operations in the self-test procedure. The FSM 152 is connected to the various components of the data communications system 100 by a bidirectional control bus as indicated in the figure. The FSM 152 receives the following signals from the external test system 50: TEST, SERIAL_IN, SERIAL_TEST_CLOCK. The FSM 152 outputs the SERIAL_OUT signal to the external test system 50, which indicates the results of the self-test procedure.

The test registers 154 contain various data used to control the self-test procedure as well as indicate the test results. In a preferred embodiment of the invention, the test registers 154 may include a test control register, a test status register and a test data register (not shown).

The PNG 156 is used to generate a pseudo-random sequence of numbers input to the transmitter 110 as the TX_IN signal during the self-test procedure.

The BERT circuit 158 is used to determine the bit error rate (BER) of the transmitter 110 and/or reciever 130. The BERT circuit 158 determines the BER by comparing the RX_OUT signal against the expected data, cycle by cycle, for the entire test sequence. The BERT circuit 158 includes a PNG (not shown) similar to the PNG 156 to generate the expected data used in the comparison. The PNG of the BERT circuit 158 is synchronized to the PNG 156 such that the PNG of the BERT circuit generates the correct expected data for each clock cycle.

The CRC circuit 160 is an optional component of the data communications system 100. The CRC circuit 160 may be used in the self-test procedure to detect data errors caused by the transmitter 110 and/or receiver 130. The CRC circuit 160 inserts a CRC code in the data input to the transmitter 110 and verifies that the CRC code in the data output by the receiver 130 is correct using conventional CRC error detecting algorithms.

The self-test procedure performed by the data communications system 1100 to test the transmitter 110 and receiver 130 will now be described. The self-test procedure is conducted by connecting the data communications system 100, which is typically disposed on an integrated circuit, to an external test system 50. In a preferred embodiment of the invention, the external test system 50 comprises a relatively simple and inexpensive apparatus that provides an interface to the internal test control system 150, such as a personal computer. In other embodiments, the external test system 50 may comprise a more sophisticated apparatus such as an automated test equipment (ATE) tester.

The self-test procedure is initiated by placing the data communications system 100 in a self-test mode. The data communications system 100 may be placed in the self-test mode by the external test system 50 asserting a test mode signal or setting a bit in the test registers 154 of the internal test control system 150. Alternatively, the data communications system 100 may be placed in the self-test mode after installation: in a system by appropriately configuring and operating the system in which it is installed. Once the data communications system 100 is placed in the self-test mode, the internal test control system 150 conducts the self-test procedure.

The self-test procedure consists of a functional test and a parametric test. The functional test is performed to verify the functionality of the transmitter and receiver. The parametric test is performed to determine whether the electrical characteristics (i.e., signal amplitude and timing or jitter) of the output of the transmitter 110 and the input of the receiver 130 meet the required specifications. The functional and parametric tests each consist of a transmitter test for testing the transmitter 110 and a receiver test for testing the receiver 130.

In the following description of the self-test procedure in a preferred embodiment of the invention, the functional and parametric tests are conducted separately. In addition, the transmitter and receiver tests are conducted separately. In other embodiments, however, the functional and parametric tests and/or the transmitter and receiver tests may be combined in a single test.

The functional test may be conducted at a relatively low clock speed. The functional test for the transmitter and receiver are similar and will be discussed together. In the functional test, the PNG 156 of the internal test control system 150 generates a test sequence consisting of a pseudo-random sequence of numbers that are input as the TX_IN signal to the transmitter 110. In response to receiving this test sequence, the transmitter 110 generates the TX_OUT signal. The receiver 130 receives the TX_OUT signal at the RX_IN input and in response, generates the RX_OUT signal. The BERT circuit 158 of the internal test control system 150 compares the RX_OUT signal output by the receiver 130 against the test sequence input to the transmitter 110, cycle by cycle, for the entire test sequence to determine the BER of the transmitter 110. The BER is then stored in one of the test registers 154 of the internal test control system 150. The external test system 50 then reads out the BER from the test register.

The external test system 50 uses the BER to determine whether the transmitter 110/receiver 130 has passed or failed the functional test based of characterization data that is stored in the test system. The characterization data is obtained in the laboratory by a process described below. If the BER is less than or equal to a maximum allowable BER, which is empirically determined from the characterization data, this indicates that the transmitter 110/receiver 130 has passed the functional test. However, if the BER is greater than the maximum allowable BER, this indicates that the transmitter 110/receiver 130 has failed the functional test and thus cannot be used.

The parametric test is similar in most respects to the functional test just described, except for the following. First, the parametric test is preferably conducted in a sequence of progressively higher speeds, starting at the lowest operational speed and then increased until the maximum operating speed of the data communications system under test is determined. Second, the parametric test measures the BER multiple times over various combinations of amplitude and skew of the TX_OUT signal. The amplitude and skew of the TX_OUT signal is varied by specified amounts to determine if the data communications system 100 is functioning within the required specifications, as indicated by the eye diagram shown in FIG. 2 when testing the transmitter and FIG. 3 when testing the receiver. The maximum allowable BER for the various combinations of amplitude and skew are empirically determined from characterization data as described below. The amplitude and skew of the TX_OUT signal is varied by the transmitter output buffer 115 under the control of the internal test control system 150. The amplitude and skew of the TX_OUT signal may be further varied by the adjustable active termination circuit 190, as explained below. Third, the test sequence used in the parametric test may be shorter than the sequence used in the functional test. Fourth, the transmitter logic circuit 112 of the transmitter 110 may be bypassed so that the TX_IN signal is fed directly to the transmitter output buffer 115.

During the self-test procedure, it is desirable to minimize the skew or jitter present in the clock signal of the data communications system 100 to avoid affecting the skew of the TX_OUT signal. In a preferred embodiment of the invention, the clock signal jitter is minimized by saturating the output of a phase detector (not shown) of the PLL 170. In an alternative embodiment, the clock signal jitter is minimized by bypassing the PLL 170 and directly feeding an external clock signal to the transmitter 110 and receiver 130.

FIG. 5 is a table containing characterization data for the data communications system 100 that is used in the self-test procedure to determine whether the system under test conforms to the required specifications. The characterization data is obtained by varying and measuring various parameters from a large number of samples of the data communications system 100 in the laboratory. The table shown in the figure indicates the BER of the data communications system 100 measured at varying amplitude (V) and timing values (T) for the TX_OUT signal. The amplitudes listed in the table ranges in value from V1 to V6. The timings listed in the table ranges in value from T1 to T6. The BER listed in the table ranges in value from B1 to B7. The circled entries in the table have been determined to conform to the required specifications by direct measurement with external test equipment, while the uncircled entries have been determined to not be in conformance. This table is provided merely as an illustration and may in practice differ significantly depending on various factors, such as the clock frequency at which the data communications system 100 is tested or the fabrication process used to manufacture the system.

As mentioned earlier, the characterization data is used by the self-test procedure to determine whether the data communications system 100 under test meets the required specifications. More specifically, the characterization data is used to establish a correlation between the required amplitude and timing specifications for the data communications system 100 and the BER measured at various amplitude and timing deviations during the self-testing procedure. The use of the characterization data in the self-testing process reduces the number and complexity of tests that must be performed to determine whether the data communications system 100 meets the required specifications.

Figure 6:
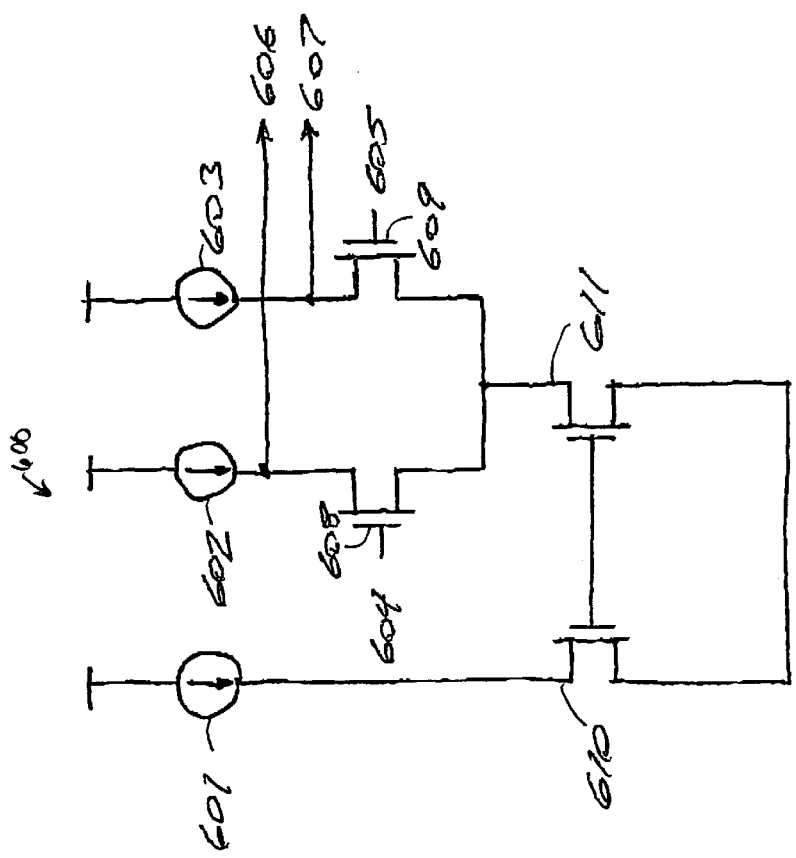
FIG. 6 is a circuit diagram of a prior art differential output buffer.

FIG. 6 is a circuit diagram of a conventional differential output buffer stage 600. A conventional differential output buffer consists of one or more stages 600. The differential output buffer stage 600 is described as a point of comparison for the transmitter output buffer stage 700 of the transmitter output buffer 115 to be described next. The differential output buffer stage 600 includes transistors 608 and 609, whose gates receive a differential input signal from a previous stage of the output buffer. The differential output signal is produced on output lines 606 and 607. Current sources 602 and 603 provide current to the transistors 608 and 609 and establish the common mode output voltage. Current source 601 provides current to transistor 610. Transistors 610 and 611 are arranged in a conventional current mirror configuration, such that the current flow through transistor 610 is multiplied by a factor that is selected during the design of the circuit. Thus the current flow through transistor 611 could be, for example, five times the current flow through transistor 610.

Figure 7:
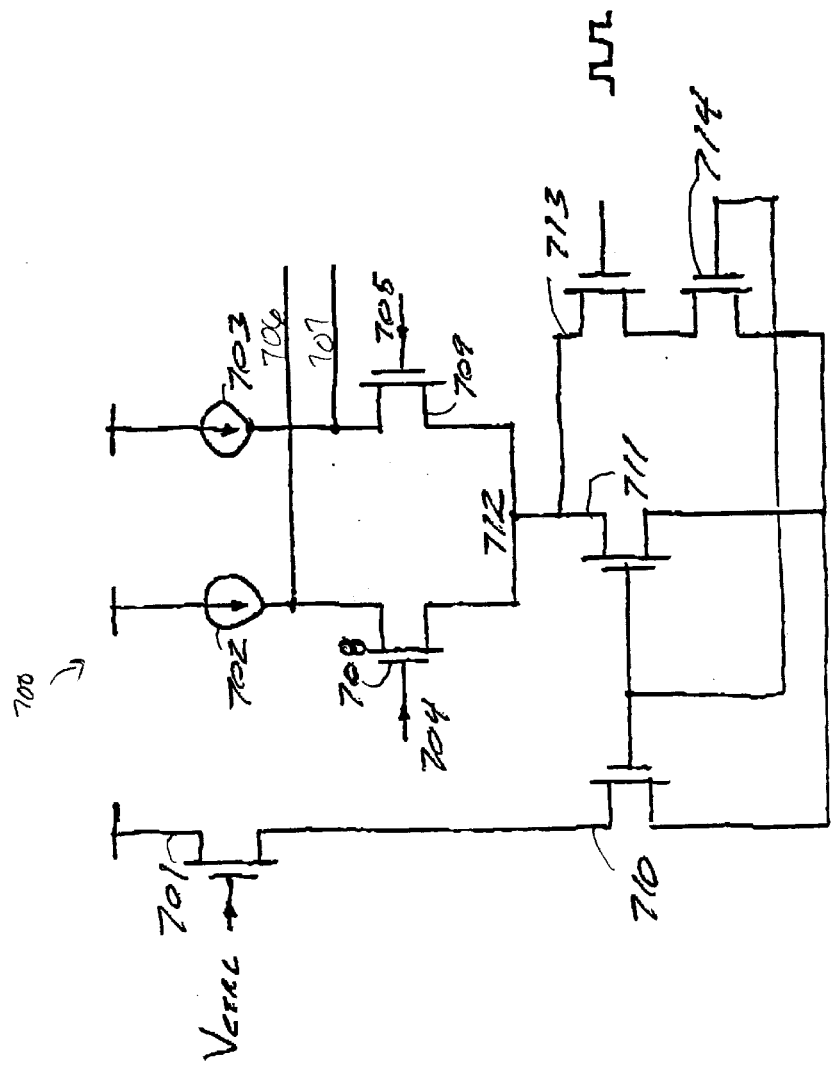
FIG. 7 is a circuit diagram of the adjustable transmitter output buffer of FIG. 1.

FIG. 7 is a circuit diagram of an adjustable transmitter output buffer stage 700 in a preferred embodiment of the invention. The transmitter output buffer stage 700 comprises one of the one or more stages of the transmitter output buffer 115. In a preferred embodiment of the invention, the transmitter output buffer stage 700 is the final stage of the transmitter output buffer 115. As previously mentioned, the adjustable transmitter output buffer 115 varies the amplitude and skew of the TX_OUT signal during the self-test procedure.

In this embodiment, the transmitter output buffer 115 is a differential circuit, although in other embodiments the buffer may be non-differential. The transmitter output buffer stage 700 in this embodiment receives a differential signal output by a previous stage of the buffer and outputs the TX_OUT differential signal onto the communications channel. In other embodiments, however, the transmitter output buffer stage 700 may output a differential signal to a successive stage.

The transmitter output buffer stage 700 is essentially a modification of the prior art differential output buffer stage 600, as will now be described. The transmitter output buffer 115 includes transistors 708 and 709, whose gates receive a differential input signal TX_OUT' from a previous stage of the output buffer. The components TX_OUT+ and TX_OUT− of the differential output signal TX_OUT are produced on output lines 706 and 707, respectively. Current sources 702 and 703 provide current to the transistors 708 and 709 and establish the common mode voltage of the TX_OUT+ and TX_OUT−signal components. The Vctr1 signal is used to vary the output of current source 701, which provides current to transistor 710. Transistors 710 and 711 are arranged in a standard current mirror configuration, such that the current flow through transistor 710 is multiplied by a factor that is selected during the design of the circuit. Thus the current flow through transistor. 711 could be, for example, five times the current flow through transistor 710.

The Vctr1 signal, which is output by the internal test control system 150, is used to vary the amplitude (i.e., voltage swing) and timing of the TX_OUT signal at a relatively slow rate of speed. The Vctr1 signal varies the current output by the current source 701, which in turn affects the current flow through the transistors 710 and 711 of the current mirror, thereby directly affecting the gain dependency of the transistors 708 and 709. During the self test procedure, Vctr1 can be varied to change the amplitude and timing parameters of the TX_OUT signal, with the BER computed for various combinations of amplitude and timing parameters.

Transistors 713 and 714 are used to modify the current flow through node 712 and introduce time domain jitter into the TX_OUT signal. Just as the current flow through 711 is a multiple of the current flow through 710, the current flow through 714 is also a multiple of the current flow through 710. Transistor 713 operates as a switch, which is normally off and prevents the flow of current from current source 714 to node 712. The gate of transistor 713 receives a PNG1 signal output by the internal test control system 150. The PNG1 signal may consist of pseudo-random pulses, which randomly varies the flow of current from current source 714 into node 712 at a relatively fast rate. This causes the slew rate of TX_OUT signal to vary in such a way as to introduces time domain jitter into the output waveform. Thus, the PNG signal is is used to vary the amplitude and timing of the TX_OUT signal at a rate of speed that is faster than that produced by the Vctr1 signal.

As the amplitude is varied and varying amounts of time domain jitter are introduced into the TX_OUT signal, the BER of the data communications system 100 is computed. The internal test control system 150 will store the test results for the varying amplitude and jitter values until enough data has been accumulated to determine the relative performance level of the data communications system 100. Such a test can be done at the maximum operational speed of the system or it can be started at the lowest operational speed and then increased until the maximum operating speed of the device under test is determined.

Figure 8:
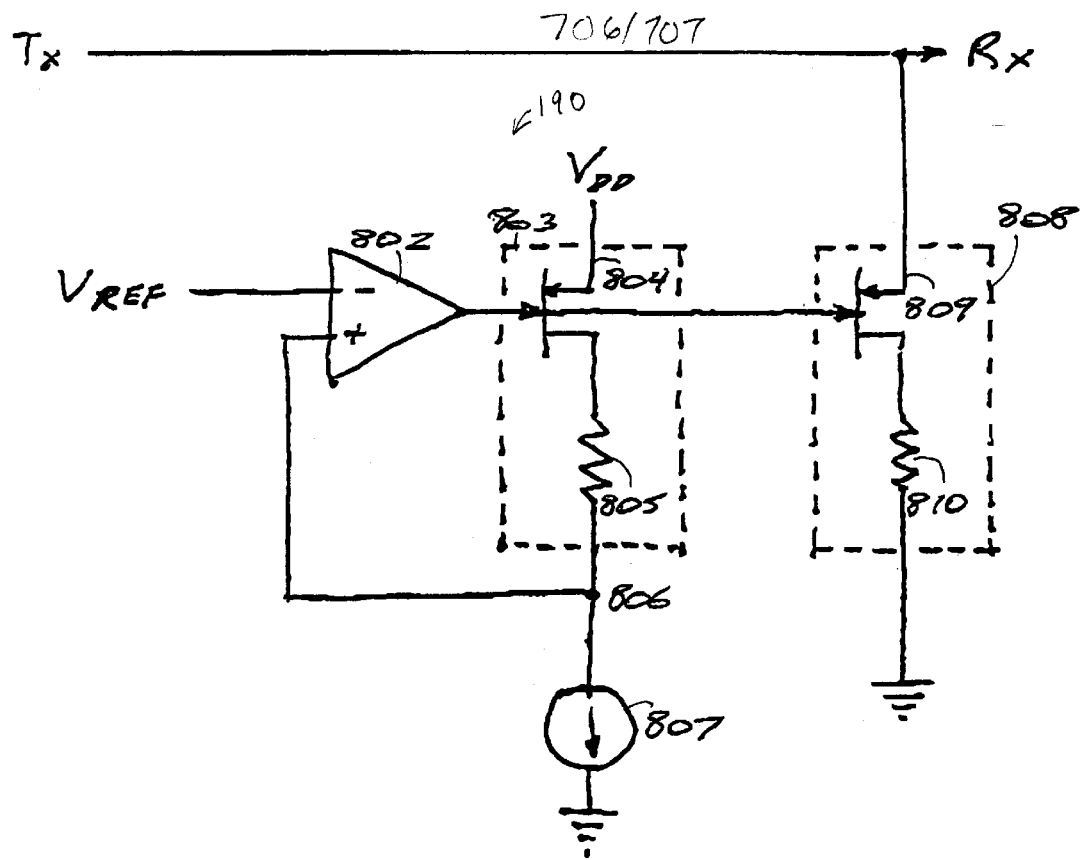
FIG. 8 is a circuit diagram of a portion of the adjustable active termination circuit of FIG. 1.

FIG. 8 shows one of the two adjustable active termination circuits 190 of the data communications system 100 in accordance with a preferred embodiment of the invention. The data communications system 100 includes two identical active termination circuits 190 connected to the respective conductors 706 and 707 of the communications channel. The active termination circuit 190 provides two functions. First, the active termination circuit 190 provides termination for the conductors 706 and 707 at the receiver end of the communication channel to minimize reflections in the TX_OUT signal transmitted over the communications channel. Thus, the active termination circuits 190 are turned on and functional during normal operation only when the data communications system 100 is used as a receiver. Second, during the self-test procedure, the active termination circuit 190 varies its impedance Z under the control of the internal test control system 150. The varying of the impedance Z introduces varying amounts of reflection in the TX_OUT signal, thereby causing amplitude and time-domain jitter variations in the signal.

The active termination circuit 190 includes an impedance 808 consisting of an active resistor 809 in series with a passive resistor 810. The active termination circuit 190 also includes a reference impedance 803 having an impedance Z consisting of an active resistor 804 in series with a passive resistor 805. The impedance Z of the reference impedance 803 is controlled by a control signal received from operational amplifier 802. As part of a negative feedback loop, the operational amplifier 802 compares the voltage drop across resistors 804 and 805 against a reference voltage Vref to generate a control voltage which controls the drain-to-source voltages, and thus the channel resistances, of active resistors 804 and 809. Current source 807 limits the current flow through the reference impedance 803. The active termination circuit 190 is further described in the copending U.S. patent application Ser. No. 09/490,707, entitled "Active Termination Network," and assigned to the assignee of the present application, which is hereby incorporated by reference.

Figure 9:
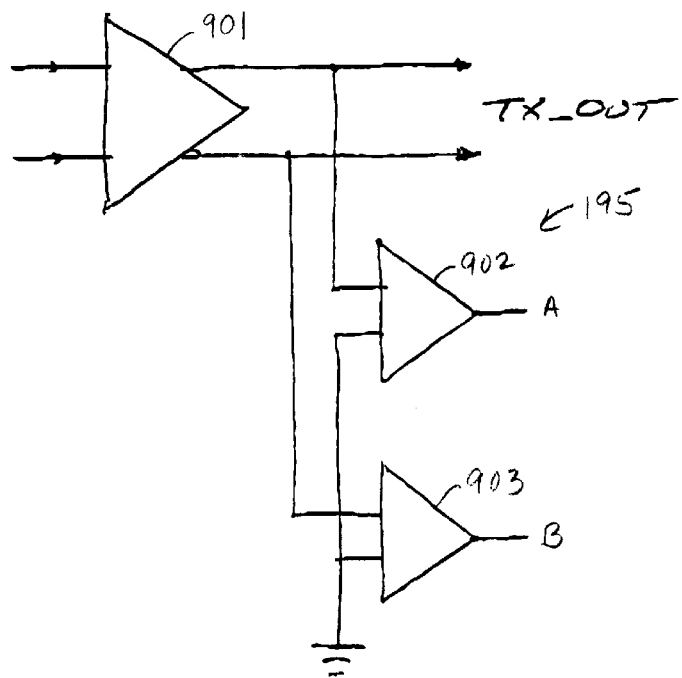
FIG. 9 is a block diagram of the receiver link detector 195 of FIG. 1.

FIG. 9 is a block diagram of a receiver link detector 195 in a preferred embodiment of the invention. The receiver link detector circuit 195 is used in a transmitter to detect the connection of a receiver at the other end of the communications channel. Block 901 is the transmitter output buffer. Comparators 902 and 903 compare the voltages of each of the differential output lines of the TX_OUT signal to a reference voltage of zero volts, i.e., ground. When the input voltage to the comparator is zero volts, the comparators will generate a low output. When the input to the comparator is above zero, the comparators will generate a high output.

When the transmitter is connected to a receiver, there will be a differential voltage on the TX_OUT signals lines, which will cause the output A of comparator 902 to go high and the output B of comparator 903 to go high, i.e., A=B=high.

When the transmitter is not connected to a receiver, there will be zero volts on the TX_OUT signals lines, which will cause the outputs A and B of the respective comparators 902 and 903 to both go low, i.e., A=B=low. Thus the receiver link detector is able to detect from the transmitter side of a connection, whether or not there is a receiver connected at the other end of the link.

Figure 10:
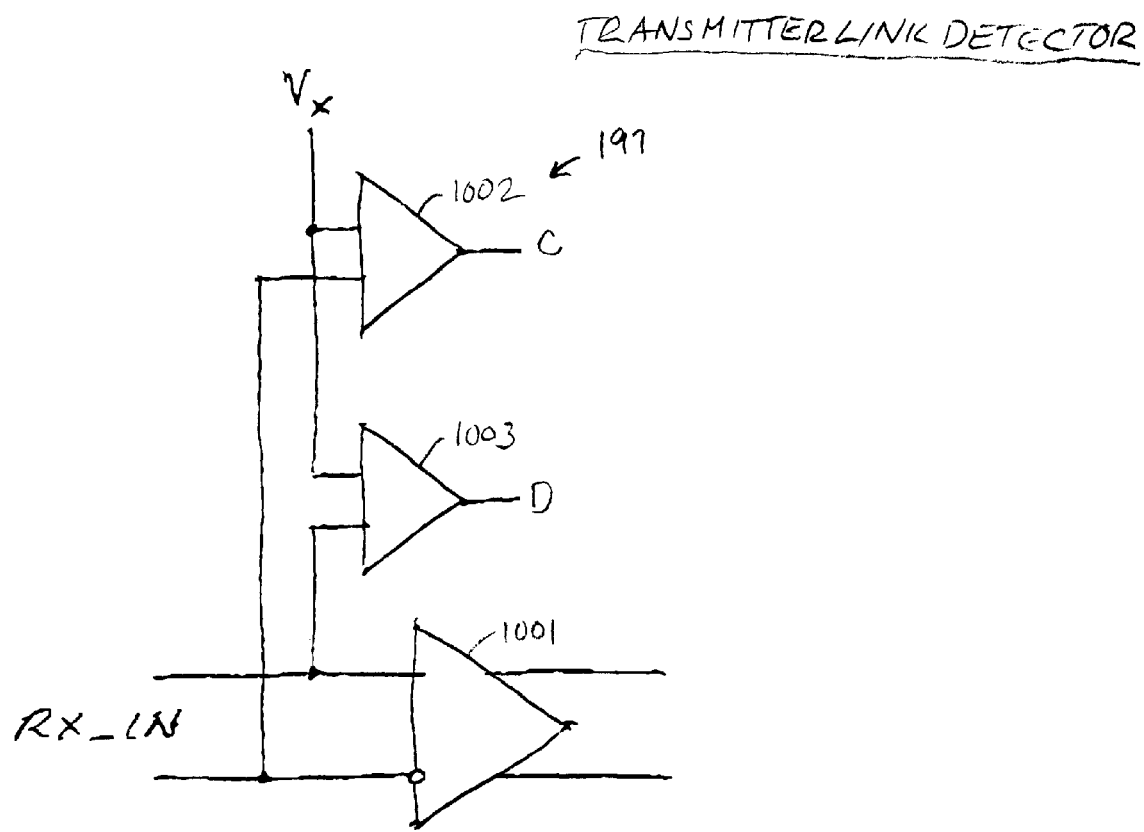
FIG. 10 is a block diagram of the transmitter link detector 197 of FIG. 1.

FIG. 10 is a block diagram of a transmitter link detector 197 in a preferred embodiment of the invention. The transmitter link detector circuit 197 is used in a receiver to detect the connection of a transmitter at the other end of the communications channel. Block 1001 is the receiver input buffer. Comparators 1002 and 1003 compare the voltages of each of the differential output lines of the RX_IN signal to a reference voltage Vx, set at a voltage incrementally below Vdd. When the input voltage to the comparator is above Vx, the comparator will generate a high output. When the input to the comparator is below Vx, the comparator generate a low output.

When the receiver is connected to a transmitter, there will be a differential voltage on the RX_IN signals lines, below that of Vx, which will cause the outputs C and D of the respective comparators 1002 and 1003 to both go low, i.e., C=D=low.

When the receiver is not connected to a transmitter, the same voltage, just above Vx, will appear on the RX_IN signals lines, which will cause the outputs C and D of the respective comparators 1002 and 1003 to both go high, i.e., C=D=high. When there is no transmitter present, the voltages on both RX_IN signal lines will go to Vdd, for a DVI channel. A DVI transmission channel is terminated at the inputs of the receiver. The terminating resistors are connected between Vdd and the input connections to the receiver. Since the terminations are to Vdd, the input line voltages will be pulled up to Vdd, when there is no transmitter connected to the receiver. Thus the transmitter link detector is able to detect from the receiver side of a connection, whether or not there is a transmitter connected at the other end of the link.

Figure 11:
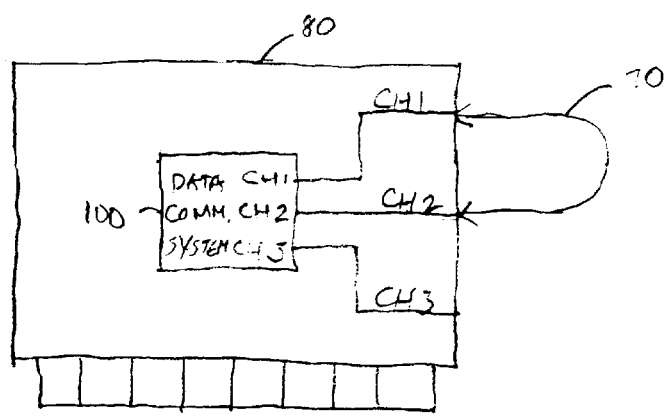
FIG. 11 is a diagram illustrating a board-level loopback test for the data communications system of FIG. 1.

FIG. 11 is a block diagram illustrating a board-level loopback test for the data communications system 100 in accordance with a preferred embodiment of the invention. The loopback test is used to test the functionality of a transmitter 110 or receiver 130 of the data communications system 100 at the board level. The loopback test is performed by "looping back" the output of a transmitter 110 of the data communications system 100 to the input of a receiver 130 of the same system and testing the system using a test sequence similar to the self-test procedure described earlier. The data communications system 100 provides an "autodetect loopback" feature in which the system detects if a loopback test is to be performed and if so, automatically configures itself to perform the test.

The loopback test will be explained for a data communications system 100 that includes three transmitters 110 corresponding to communications channels CH1, CH2 and CH3. The data communications system 100 is mounted on a board 80. Of course, the loopback test can be performed with other configurations of the data communications system 100 having two or more communications channels.

The loopback test to test the transmitter 110 of channel CH1 and/or receiver 130 of CH2 is performed as follows. First, a loopback cable 70 is connected to connectors on the board 80 corresponding to the CH1 and CH2 channels. Second, the data communications system 100 senses the connection of the loopback cable 70 between the CH1 and CH2 channels and automatically switches the operation of the channel CH2 from transmitter to receiver. Third, the data communications system 100 performs a test sequence that is similar in most respects to the self-test procedure described earlier. Fourth, a test logic circuit (not shown) on the board 80 reads the test data from the data communications system 100 and based on this data, provides an appropriate test result indication.

If the test results indicate that an error occurred and it is desired to determine whether the defect lies in the transmitter 110 of channel CH1 or the receiver 130 of channel CH2, further tests must be conducted. To determine if the transmitter 110 of channel CH1 is defective, the above-described test is repeated using the transmitter 110 of channel CH1 and the receiver 130 of channel CH3. If this test also produces an error, this suggests that the transmitter 110 of channel CH1 is defective.

Similarly, to determine if the receiver 130 of channel CH2 is defective, the above-described test is repeated using the transmitter 110 of channel CH3 and the receiver 130 of channel CH2. If this test also produces an error, this suggests that the receiver 130 of channel CH2 is defective.

Figure 12:
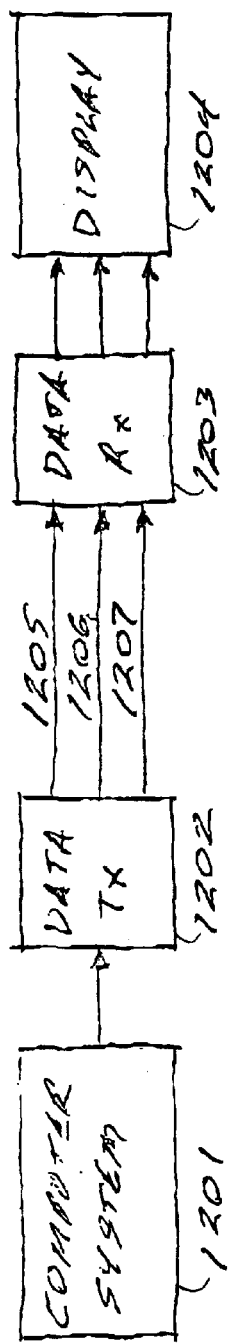
FIG. 12 is a block diagram, illustrating the normal operation of a pair of interconnected data communications systems in accordance with a preferred embodiment of the invention.

FIG. 12 is a block diagram illustrating the normal operation of a pair of interconnected data communications systems in a preferred embodiment of the invention. The data communications systems are configured as a transmitter 1202 and receiver 1203 to create a link between a computer system 1201 and a display 1204. The computer system 1201 generates digital video data, which is converted to serial data by the transmitter 1202. The data is sent to the receiver 1203 via communications channels 1205, 1206 and 1207. Receiver 1203 converts the serial data into a form that the display 1204 can accept, which may be in the form of either digital or analog video signals.

Built-in self-test capabilities provide new ways to test data communications systems, as has been discussed previously. Performing system-level tests of data communications systems having BIST capabilities can be done in ways that were otherwise not practical or impossible to perform, as will now be described.

Figure 13:
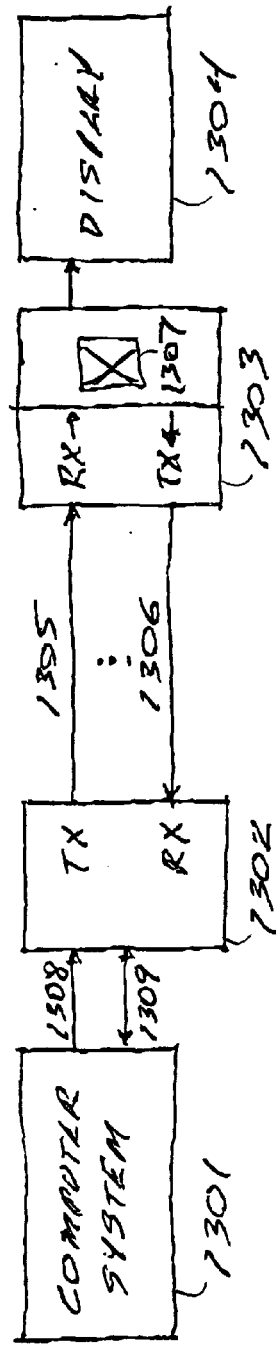
FIG. 13 is a block diagram illustrating a system-level loopback test for a pair of interconnected data communications systems in accordance with a preferred embodiment of the invention.

FIG. 13 is a block diagram illustrating a system-level loopback test for a pair of interconnected data communications systems 1302 and 1303 in a preferred embodiment of the invention. The data communications systems 1302 and 1303 include multiple communications channels, including channels 1305 and 1306. The system-level loopback test is used to verify the operational characteristics of the data communication systems 1302 and 1303 and the communications channels that connect the systems. It should be noted that in other embodiments of the invention the system-level test may be implemented differently from that shown in the figure.

The system-level test of the data communications systems 1302 and 1303 is performed under the control of a software program executed by computer system 1301. The computer system 1301 initiates the system-level test by placing the data communications systems 1302 and 1303 in a test mode. The computer system 1301 then initiates a sequence of steps such that each of the channels of the data communications systems 1302 and 1303 can be tested through the selective cross-connecting of each of the channels, so that each channel can be tested by sending data through it in both directions.

A portion of the system-level test will now be described to illustrate the test procedure. In this portion of the test, the computer system 1301 configures the data communications system 1302 such that a transmitter is connected to channel 1305 and a receiver is connected to channel 1306. The computer system conversely configures the data communications system 1303 such that a receiver is connected to channel 1305 and a transmitter is connected to channel 1306. The computer system 1301 sends a command to the data communications system 1303 via test bus 1309 and any one of the communications channels to instruct the cross-connect device 1307 to connect the output of the receiver to the input of the transmitter. The computer system 1301 then sends a sequence of test data via bus 1308 to the transmitter of the data communications system 1302. Next, the transmitter transmits the test data via channel 1305 to the receiver of the data communications system 1303, which then routes the test data to the transmitter of the system. The transmitter of the data communications system 1303 then transmits the test data via channel 1306 to the receiver of the data communications system 1302. Finally, the BERT contained in the receiver of the data communications system 1302 analyzes the received test data and sends the results to computer system 1301 for storage and analysis. The computer system 1301 repeats this procedure by appropriately changing the configuration of the data communications systems 1302 and 1303 until all of the channels are completely tested.

In an alternative embodiment of the invention, the system-level test can be performed without looping back the test data. In this embodiment, the transmitter of the data communications system 1302 sends test data to the receiver of the data communications system 1303. The BERT contained in the receiver of the data communications system 1303 then sends the BER results back to the computer system 1301 via any of the channels not in use during the test.

In a DVI dual-link system, which includes six channels, the system-level test may be implemented as follows. Three of the channels may be used to transmit test data from the data communications system 1302 to the data communications system 1303. The other three channels may be used to receive back the retransmitted test data in a loopback mode or alternatively, receive the BERT results.

Figure 14:
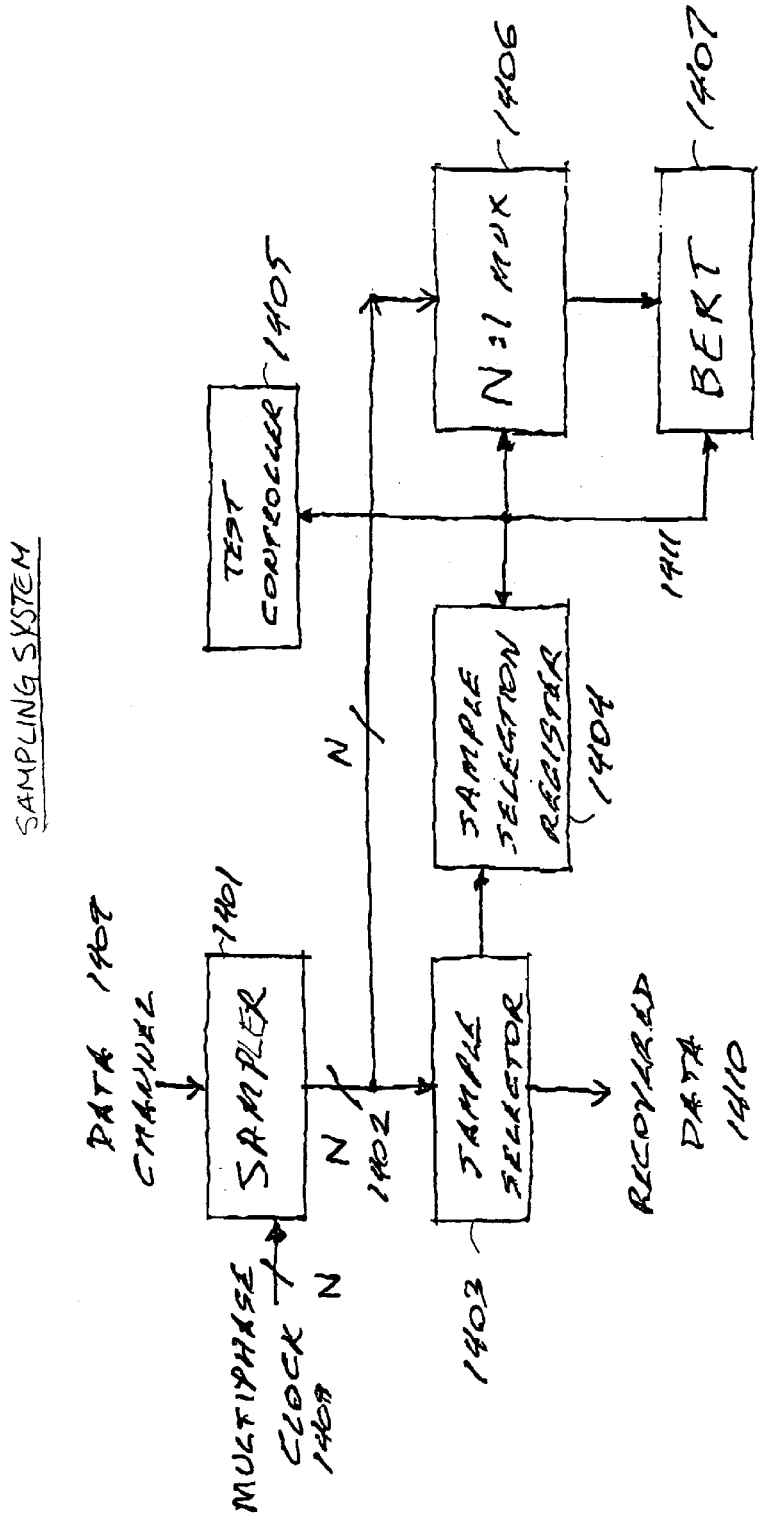
FIG. 14 is a block diagram of a sampling system optionally included in the data communications system of FIG. 1.

FIG. 14 is a block diagram of a sampling system optionally included in the data communications system 100. The sampling system is used to determine the amount of timing jitter present in a signal received by the data communications system.

The sampling system includes a sampler 1401. The sampler 1401 uses a multiphase clock 1408 to generate N samples per data bit period from the data channel 1409. The digital data 1409 has certain maximum levels of skew and jitter. Test data with certain specific pattern characteristics can also be used as the incoming data stream. The N samples are sent to sample selector 1403, which analyzes the samples to determine the optimum sample to be used to recover the original data stream. The sampler attempts to select the optimum sample in the approximate center of every incoming data pulse. As every N samples are analyzed and a sample is chosen in the center of the incoming data, the optimum sampling position is stored in sample selection register 1404.

Test controller 1405 uses the sampling position stored in 1404 to select one of the N samples coming from sampler 1401. Multiplexer 1406 is used to select whichever one of the N samples needs to be sent to BERT 1407 for computation of the bit error rate. As the optimum sampling position moves to the left or to the right of the initial optimum, the BERT continues its computations until enough data has been analyzed.

After a BER has been determined for the optimum sampling position, the test controller then directs the multiplexer 1406 to select an adjacent sampling position in order to generate a BER for that position. The test controller can gather additional BERs for sampling positions to the left and right of the optimum position. After repeating the BER analysis, a sufficient amount of data will be available to generate a graph, as shown in FIG. 15.

Figure 15:
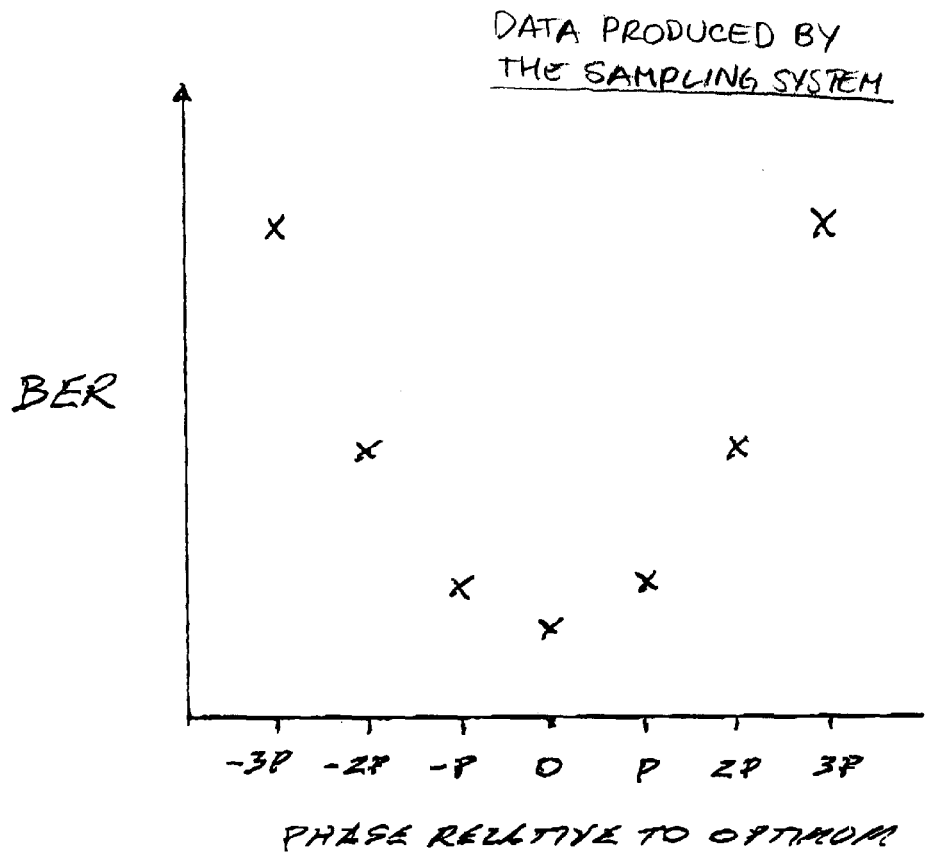
FIG. 15 is a sample graph of bit error rate versus phase relative to an optimum sampling position obtained with the sampling system of FIG. 14.

FIG. 15 is a sample graph of bit error rate (BER) versus phase relative to an optimum sampling position obtained with the sampling system shown in FIG. 14. The horizontal axis is the phase of a sampling position relative to the optimum, which is at 0. The vertical axis shows bit error rates, as they increase from the bottom to the top of the axis. The x's on the graph show BER as computed for the various sampling positions indicated. There is a correlation between the amount of bit error at any given sampling position and the amount of jitter on that edge of a data pulse.

While specific embodiments of the invention have been described and illustrated, it will be appreciated that modifications can be made to these embodiments without departing from the spirit of the invention. Therefore, it is intended that the scope of the invention be defined by the following claims and their equivalents.

What is claimed is:

1. A data communications system incorporating built-in self test systems, comprising:

a data communications transmitter;

a data communications receiver connected to the output of the transmitter;

a data generator connected to the input of the transmitter;

a bit error rate analyzer of the output of the receiver;

storage means for storing predetermined correlations between error rate data and operating specifications of the data communication system; and a test controller for performing a sequence of tests on the data communications system and determining operating characteristics of the data communications system.

2. The data communications system of claim 1, wherein the data communications system is disposed on an integrated circuit.

3. The data communications system of claim 1, wherein the data communications transmitter and data communications receiver are configured to be compatible with Digital Video Interface specifications.

4. A method for testing a data communications system comprising a transmitter, a receiver and a test control system, comprising the steps of:

generating first test data with the test control system;

inputting the first test data to the transmitter;

generating second test data from the first test data with the transmitter;

transmitting the second test data to the receiver;

receiving the second test data with the receiver;

generating third test data from the second test data with the receiver; and comparing the third test data with the first test data to determine a data error rate of the data communications system.

5. A method for performing a test of a first data communications system, comprising the steps of:

coupling the first data communications system to a second data communications system with a data communications link;

transmitting test data with a data transmitter of the first data communications system through a first channel of the data communications link;

receiving the test data with a data receiver of the second data communications system through the first channel of the data communications link, wherein the received test data may not be identical to the transmitted test data because of an error; and calculating a data error rate of the received test data;

transmitting the data error rate with a data transmitter of the second data communications system through a second channel of the data communications link; and receiving the data error rate with a data receiver of the first data communications system through the second channel of the data communications link.

6. A method for performing a data communications system test, comprising the steps of:

coupling the first data communications system to a second data communications system with a data communications link having a plurality of channels;

transmitting test data with a data transmitter of the first data communications system through a first said channel of the data communications link;

receiving the test data with a data receiver of the second data communications system through the first said channel of the data communications link, wherein the received test data may not be identical to the transmitted test data because of an error;

transmitting said received test data with a data transmitter of the second data communications system through a second said channel of the data communications link;

receiving the transmitted said received test data with a data receiver of the first data communications system through the second said channel of the data communications link; and calculating a data error rate of the transmitted said received test data received by the data receiver of the first data communications system.

7. The method of claim 6, wherein an assignment of the channels of the data communications link is performed by an external computer system.

8. The method of claim 6, further comprising connecting an output of the data receiver of the second data communication system with an input of the data transmitter of the second data communication system using a cross-connect device.

* * * * *